(12) United States Patent
Park et al.

(10) Patent No.: US 12,455,307 B2
(45) Date of Patent: Oct. 28, 2025

(54) OPEN-STRUCTURED RF TRANSMITTING AND RECEIVING COIL SYSTEM FOR DETECTING MAGNETIC PARTICLES

(71) Applicant: KOREA INSTITUTE OF MEDICAL MICROROBOTICS, Gwangju (KR)

(72) Inventors: Jong Oh Park, Gyeonggi-do (KR); Jayoung Kim, Daejeon (KR)

(73) Assignee: KOREA INSTITUTE OF MEDICAL MICROROBTICS, Gwangju (KR)

( * ) Notice: Subject to any disclaimer, the term of this patent is extended or adjusted under 35 U.S.C. 154(b) by 378 days.

(21) Appl. No.: 18/123,464

(22) Filed: Mar. 20, 2023

(65) Prior Publication Data

US 2023/0296656 A1    Sep. 21, 2023

(30) Foreign Application Priority Data

Mar. 21, 2022   (KR) ........................ 10-2022-0034445

(51) Int. Cl.
  *G01R 27/04*  (2006.01)
  *G01R 29/08*  (2006.01)
(52) U.S. Cl.
  CPC .............................. *G01R 29/0807* (2013.01)

(58) Field of Classification Search
  CPC .............. G01R 33/0017; G01R 33/038; G01R 33/1276; G01R 29/0807; A61B 5/0515
  See application file for complete search history.

(56) References Cited

U.S. PATENT DOCUMENTS

| | | | | |
|---|---|---|---|---|
| 8,027,714 B2* | 9/2011 | Shachar | ................. | A61B 34/73 600/409 |
| 9,008,749 B2* | 4/2015 | Buzug | ................. | A61B 5/0515 600/409 |
| 11,561,270 B2* | 1/2023 | Jong | .................. | G01R 33/1276 |
| 2008/0309330 A1* | 12/2008 | Ohyu | ...................... | A61B 5/05 324/232 |
| 2012/0143047 A1* | 6/2012 | Kimura | .............. | A61B 1/00158 600/424 |
| 2015/0276902 A1* | 10/2015 | Weaver | .............. | G01R 33/4808 324/309 |

* cited by examiner

*Primary Examiner* — Thang X Le
(74) *Attorney, Agent, or Firm* — Harness, Dickey & Pierce, P.L.C.

(57) ABSTRACT

Disclosed is an open-structured RF transmitting and receiving coil system including: a magnetic field generation part configured to generate a magnetic field to detect the position of magnetic particles located in a three-dimensional space; a detection part configured to receive a reflection signal from the magnetic particles receiving the magnetic field; and a cancellation part connected to the detection part and including a calibration coil.

9 Claims, 8 Drawing Sheets

OPEN-STRUCTURED RF TRANSMITTING AND RECEIVING COIL SYSTEM FOR DETECTING MAGNETIC PARTICLES

CROSS-REFERENCE TO RELATED APPLICATION

This application claims priority to Korean Patent Application No. 10-2022-0034445, filed on Mar. 21, 2022. The entire disclosure of the application identified in this paragraph is incorporated herein by reference.

FIELD

The present disclosure was made by Task Unique No. 1415184155, Task No. RS-2021-KD000310 under the support of the Ministry of Science and ICT, the Ministry of Trade, the Ministry of Health & Welfare, the Ministry of Food and Drug Safety. The research management institution for the above project is the Korea Medical Device Development Fund, the research business name is "Korea Medical Device Development Fund Business", and the research project name is "Development of active precision delivery medical device based on micro cartilage for knee cartilage regeneration". The host institute is the Korea Institute of Medical Microrobotics, and the research period is from Apr. 1, 2021 to Dec. 31, 2025.

The present disclosure relates to an open-structured RF transmitting and receiving coil system, including: a magnetic field generation part configured to generate a magnetic field to detect the position of magnetic particles located in a three-dimensional space; a detection part configured to receive a reflection signal from the magnetic particles receiving the magnetic field; and a cancellation part connected to the detection part and including a calibration coil.

BACKGROUND

Targeted drug delivery (TDD) is an effective precise drug therapy that allows a drug to exhibit maximum efficacy at a targeted site. Compared with traditional oral or intravascular administration methods, targeted drug delivery can help reduce the amount of drug used and adverse effects on healthy tissue. Thus, targeted drug delivery is being studied for the treatment of various diseases, such as cancer, nervous system diseases, and sudden sensorineural hearing loss.

Types of targeted drug delivery are passive targeting and active targeting. Passive targeting allows drug-loaded nanoparticles to be covered with a specific coating and thus to circulate in the body for a longer period of time. Active targeting involves the further enhancement in the effects of passive targeting, allowing drug-loaded particles to arrive at specific targeted sites. For active targeting, magnetic carriers have been used as an important delivery means to deliver loaded drugs to targeted sites in the body. Magnetic carriers containing magnetic nanoparticles (MNPs) are superparamagnetic and can move using an external magnetic field generated by permanent magnets or electromagnets. A magnetic field-based method for sensing magnetic nanoparticles is being considered to verify the performance of targeted drug delivery.

For the development of precise targeted drug delivery systems, the driving and targeting of magnetic particles are core challenges. Particularly, magnetic particle imaging (MPI) for finding the position of magnetic nanoparticles is a new quantitative imaging method that can create images by determining the local concentration of magnetic nanoparticles on the basis of nonlinear remagnetization behavior. Magnetic particle imaging is a tracer imaging technique and thus provides no morphological information. Nonetheless, magnetic particle imaging has received considerable attention due to the ability of magnetic nanoparticles to achieve high resolution, high sensitivity, and real-time imaging.

Magnetic particle imaging is generally implemented using two main processes. First, a magnetization process is implemented to change the level of magnetization of magnetic nanoparticles from zero to a magnetic saturation state. In this process, magnetic nanoparticles are magnetized using an inherent magnetic field known as field-free points (FFPs) or field-free lines (FFLs). The magnetic free points or magnetic free lines are generated by an arrangement structure of permanent magnets or electromagnets so that a region of interest (ROI) is closely scanned in detail to target magnetic nanoparticles. Second, in concurrence with the magnetization process, the magnetic nanoparticles are affected by a radio frequency (RF) signal derived from a transmit coil (Tx coil) to reflect the RF signal to a receive coil (Rx coil). The intensity of the reflected RF signal depends on the level of magnetization of the magnetic nanoparticles. Through this process, the magnetic nanoparticles can be imaged in a three-dimensional space by matching the intensity of the reflected RF signal with the positions of the magnetic free points or magnetic free field lines.

Existing magnetic particle imaging systems have a similar structure to commercially available magnetic resonance imaging equipment. In particular, RF systems containing Tx coils and Rx coils are configured in a bore-type structure to ensure stable particle imaging performance. However, such a closed structure has not only limitations in compatibility with surrounding medical devices in a medical aspect, but also limitations in an aspect of medical staff accessing a patient in an emergency. Moreover, such a closed structure is not appropriate for claustrophobic patients. In order to solve these problems, the development of an open-structured system for magnetic particle imaging is urgently needed.

SUMMARY

The present inventors endeavored to develop a system capable of, by having an open structure, precisely imaging magnetic particles while improving the accessibility of medical persons to a patient in an emergency situation or in a situation where medical persons need direct access to a patient during magnetic particle imaging.

As a result, it was verified that an open-structured RF transmitting and receiving coil system including a magnetic field generation part configured in an open structure while including a region of interest, a detection part disposed below the region of interest, and a cancellation part connected to the detection part and containing a calibration coil can lead to an improvement in the accessibility to a patient, causing no inconvenience to a claustrophobic patient through an open structure, and can precisely perform magnetic particle imaging, unlike conventional core-type imaging systems.

Accordingly, an aspect of the present disclosure is to provide an open-structured RF transmitting and receiving coil system.

The present disclosure is directed to an open-structured RF transmitting and receiving coil system, the system including a magnetic field generation part configured to generate a magnetic field to detect the position of magnetic particles located in a three-dimensional space, a detection part configured to receive a reflection signal from magnetic particles receiving the magnetic field, and a cancellation part connected to the detection part.

Hereinafter, the present disclosure will be described in more detail.

In accordance with an aspect of the present disclosure, there is provided an open-structured RF transmitting and receiving coil system, the system including: a magnetic field generation part including a first electromagnet set including one or more electromagnets facing a region of interest (ROI) in a three-dimensional space and a second electromagnet set including one or more electromagnets disposed symmetrically with the first electromagnet set; coupling parts coupled to the electromagnet sets, respectively; a detection part disposed below the region of interest; a cancellation part connected to the detection part; and a power source part configured to independently apply current to each of the electromagnets.

In the present disclosure, the magnetic field generation part may include a first electromagnet set including one or more electromagnets facing a region of interest (ROI) in a three-dimensional space and a second electromagnet set including one or more electromagnets disposed symmetrically with the first electromagnet set.

In the present disclosure, the region of interest (ROI) is a region which has an arbitrary volume in a three-dimensional space, and may be a region where magnetic particles are or are expected to be present. The central axes of one or more electromagnets may be aligned toward the region of interest.

In the present disclosure, the electromagnets may be at least one type of coil selected from the group consisting of a solenoid coil, a circular coil, a square coil, and a saddle coil, but are not limited thereto.

As used herein, the term "solenoid coil" may be interpreted as a tool that is made in a cylindrical shape by densely rolling a wire, and a solenoid can be used as an electromagnet since the solenoid, through which electricity passes, can create a magnetic field.

As used herein, the term "circular coil" may be interpreted as a circular electromagnet, and the circular electromagnet means a ring-shaped magnet, that is, an endless magnet that does not exhibit the effect of a demagnetization force at an end thereof.

In the present disclosure, the electromagnets may generate a magnetic field by receiving current. Through this, field free points (FFPs) or field free lines (FFLs) can be controlled.

As used herein, the term "field free point" (FFP) means a point where the intensity of a magnetic field is zero in the magnetic field generated by an electromagnet.

As used herein, the term "field free line" (FFL) means a line where the intensity of a magnetic field is zero in the magnetic field generated by an electromagnet.

In the present disclosure, the magnetic particles may be magnetic nanoparticles or microrobots including the magnetic nanoparticles, but are not limited thereto.

As used herein, the term "microrobot" is a type of implantable medical devices, and microrobots may be classified into: mechanical/electronic microrobots, such as a vascular robot and an active capsule endoscope, containing a permanent magnet or soft magnetic material as a magnetic material with a millimeter-, micrometer-, and nanometer-scale size; and polymer/cell-based microrobots, such as a micro-carrier for DDS, a micro-scaffold for cell therapy delivery, a nanorobot, and a macrophage robot, containing magnetic nanoparticles as a magnetic material with a micro-/nano-scale size, and the microrobots may include other types of microrobots.

The microrobot according to the present disclosure may further include at least one selected from the group consisting of a camera module, a position information provider, a driver, a treatment unit, a robot controller, a data transceiver, and a wireless power receiver.

In the present disclosure, the electromagnet set may include one or more electromagnets, and the electromagnets may be spaced apart from each other by a predetermined distance.

In the present disclosure, the electromagnet set may include a first electromagnet set and a second electromagnet set disposed in mirror symmetry with the first electromagnet set.

In the present disclosure, the numbers of electromagnets respectively included in the first electromagnet set and the second electromagnet set may be equal.

In the present disclosure, the coupling parts may mean supporters connected to the electromagnets, but are not limited thereto.

In the present disclosure, the detection part may be disposed below in the vertical direction of the region of interest, but is not limited thereto.

In one embodiment of the present disclosure, the detection part may be disposed parallel to the ground.

In the present disclosure, the detection part may include a first Rx coil and a first Tx coil.

In the present disclosure, the detection part may include a first through hole in the center thereof.

In the present disclosure, the first through hole may pass through the detection part in a vertical direction with respect to the ground.

In the present disclosure, a receive coil (Rx coil) may refer to a coil that is used exclusively for receiving an RF signal, and a transmit coil (Tx-coil) may refer to a coil that is used exclusively for transmitting an RF signal.

In one embodiment of the present disclosure, the circumference of the outer circumferential surface of the first Rx coil is equal to the circumference of the inner circumferential surface of the first Tx coil, and thus the outer circumferential surface of the first Rx coil may be connected to the inner circumferential surface of the first Tx coil.

In the present disclosure, the detection part may receive a reflection signal from magnetic particles receiving the magnetic field, but is not limited thereto.

In the present disclosure, the detection part may transmit the received reflection signal to the cancellation part, but is not limited thereto.

In the present disclosure, the cancellation part may receive the reflection signal from the detection part.

In the present disclosure, the cancellation part may contain a second Rx coil and a second Tx coil.

In the present disclosure, the second Rx coil may be connected to the first Rx coil.

In the present disclosure, the second Tx coil may be connected to the first Tx coil.

In the present disclosure, the cancellation part may include a second through hole in the center thereof.

In the present disclosure, the cancellation part may further contain a calibration coil section at one side of the second through hole.

In the present disclosure, the calibration coil section may include: at least one screw directed in a direction in which the second through hole passes through; and a third Tx coil coupled to the thread of the screw through a plate.

In the present disclosure, the plate may be spaced apart from the cancellation part by a predetermined distance, for example, at least 0 mm, at least 1 mm, at least 2 mm, at least 3 mm, at least 4 mm, at least 5 mm, at least 6 mm, at least 7 mm, at least 8 mm, at least 9 mm, or at least 10 mm, but is not limited thereto.

In the present disclosure, the third Tx coil may be connected to the second Tx coil.

In the present disclosure, the third Tx coil may be connected to a resonant circuit.

In the present disclosure, the resonant circuit may include a capacitor connected serially to the second Tx coil.

In the present disclosure, the calibration coil section may correct a basic voltage signal generated from the detection part by allowing the plate to be spaced apart from the cancellation part by a predetermined distance, but is not limited thereto.

In one embodiment of the present disclosure, the calibration coil section may reduce the basic voltage signal generated from the detection part to the baseline level, but is not limited thereto. Through the calibration coil, only a reflection signal received from the magnetic particles can be used and the position of the magnetic particles can be precisely detected.

In the present disclosure, the third Tx coil may include: a calibration coil winding portion wound along the outer circumferential surface of the plate; and a protruding portion, which is a peripheral portion of the outer circumferential surface of the plate protruding from the calibration coil winding portion to be adjacent to the inner circumferential surface of the calibration coil section.

In the present disclosure, the third Tx coil is able to slide by rotation of the screw.

In the present disclosure, the calibration coil section may further include a knob coupled to the screw to enable the screw to rotate, but is not limited thereto.

In the present disclosure, the knob may control the plate to be spaced apart from the cancellation part by a predetermined distance, but is not limited thereto.

The open-structured RF transmitting and receiving coil system of the present disclosure may further include a signal amplification part connected to the cancellation part, but is not limited thereto.

In the present disclosure, the signal amplification part may generate a voltage signal obtained by amplifying the reflection signal of the magnetic nanoparticles, from which noise has been removed by the cancellation part, but is not limited thereto.

The open-structured RC transmitting and receiving coil system of the present disclosure may further include a data acquisition part configured to receive the voltage signal amplified through the signal amplification part, but is not limited thereto.

In the present disclosure, the power supply may independently apply current to each of the electromagnets, but is not limited thereto.

The present disclosure is directed to an open-structured RF transmitting and receiving coil system including a magnetic field generation part configured to generate a magnetic field, a detection part configured to receive a reflection signal, and a cancellation part containing a calibration coil, wherein unlike a conventional bore-type imaging system, the open-structured RF transmitting and receiving coil system has an open structure so that the system can lead to an improvement in the accessibility to a patient, causing no inconvenience in a situation in which medical staff need directly treat a patient, such as an emergency situation, and causing no inconvenience to a claustrophobic patient, while performing precise magnetic particle imaging.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

The terminology used herein is for the purpose of describing particular embodiments only and is not intended to be limiting of the disclosure. A singular expression includes a plural expression, unless otherwise specified. It is to be understood that the terms such as "comprise" or "has" are used herein to designate a presence of characteristic, number, step, operation, element, component, or a combination thereof, and not to preclude a presence or a possibility of adding one or more of other characteristics, numbers, steps, operations, elements, components or a combination thereof.

The terms such as "first", "second", and so on may be used to describe a variety of elements, but the elements should not be limited by such terms. The terms are used only for the purpose of distinguishing one element from another. For example, a first element may be referred to as a second element and vice versa without departing from the scope of the present disclosure, and similarly, the second element may be named the first element.

Unless defined otherwise, all the terminologies used herein including technical or scientific terminologies have the same meaning as those understood by a person having ordinary skill in the art to which the present disclosure belongs. Terminologies as defined in a generally used dictionary should be interpreted to have the same meaning as those of the terminologies in context in the related descriptions, and shall not be interpreted in an ideal or excessively formal meaning unless they are explicitly defined herein.

Elements are interpreted to include an ordinary error range even if not expressly stated. In describing a time relationship, for example, when the temporal order is described as "after", "subsequent", "next", and "before", a case which is not continuous may be included unless "just" or "direct" is used.

Hereinafter, technical features of the present disclosure will be described in detail with reference to the accompanying drawings and preferable exemplary embodiments. These exemplary embodiments are provided only for the purpose of illustrating the present disclosure in more detail, and therefore, according to the purpose of the present disclosure, it would be apparent to a person skilled in the art that these examples are not construed to limit the scope of the present disclosure.

Figure 1:
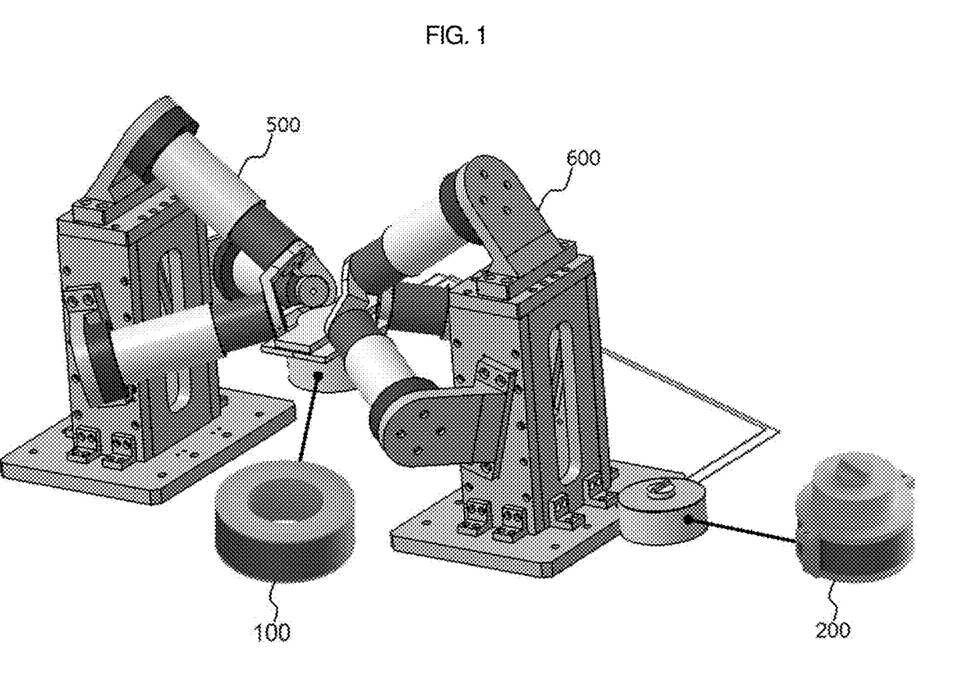
FIG. 1 shows a configuration of an open-structured electromagnetic RF coil incorporation system for magnetic particle imaging according to an embodiment of the present disclosure.

FIG. 1 shows an open-structured electromagnetic RF coil incorporation system for magnetic particle imaging according to an embodiment of the present disclosure.

As can be shown in FIG. 1, an open-structured RF transmitting and receiving coil system of the present disclosure is composed of a detection part and a cancellation part. The detection part may be disposed below an electromagnetic bed, and the cancellation part may be separately provided to be able to attach to an electromagnetic frame. The detection part may serve to detect the signal of magnetic particles located on the bed, and the cancellation part may serve to lower, to zero, the magnetically induced basic voltage of a receive coil, which is generated by an RF transmission signal of a transmit coil.

Figure 2:
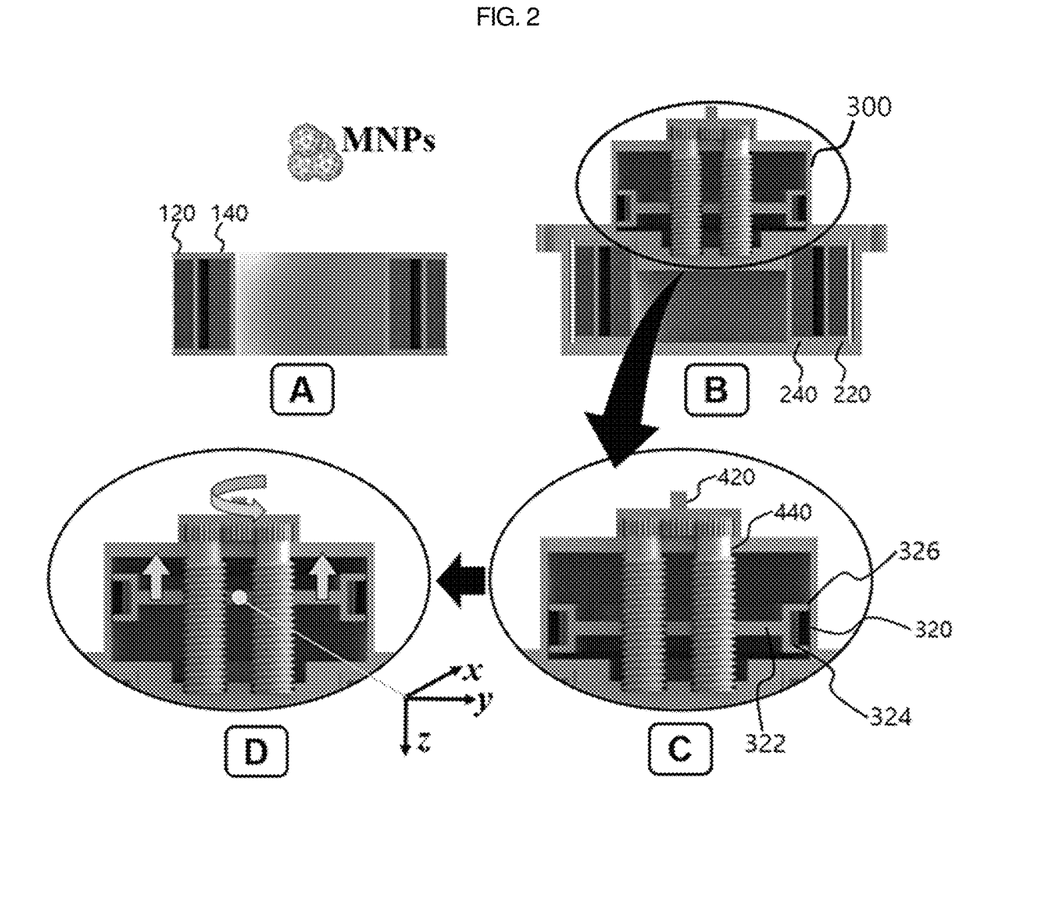
FIG. 2 shows cross-sectional views of internal structures of detection and cancellation parts of an open-structured RF transmitting and receiving coil system according to an embodiment of the present disclosure.

FIG. 2 shows cross-sectional views of internal structures of the detection and cancellation parts of the open-structured RF transmitting and receiving coil system according to an embodiment of the present disclosure.

As can be seen from FIG. 2, in the detection part, a first receive coil ($Rx_D$) may be located to be spaced apart from a first transmit coil ($Tx_D$) by a predetermined distance to be adjacent to the inner diameter surface of the first transmit coil. In the cancellation part, a second receive coil ($Rx_C$) may be located to be spaced apart from a second transmit coil ($Tx_C$) by a predetermined distance to be adjacent to the inner diameter surface of the second transmit coil. Magnetic nanoparticles may be located in a direction perpendicular to a direction in which the transmit and receive coils of the detection part are wound, and the detection part may be configured to detect the position of the magnetic nanoparticles.

The cancellation part may further include a calibration coil ($Tx_{C\_Cali}$) serving as an additional receive coil. The calibration coil may be located in a direction perpendicular to a direction in which the second transmit and receive coils, and may be connected to the second transmit and receive coils. The conditions for fabricating the transmitting, receiving, and calibration coils according to an embodiment of the present disclosure are shown in Table 1.

TABLE 1

| Coil type | Number of times of winding | Outer diameter (mm) | Inner diameter (mm) | Height (mm) | Diameter (mm) |
|---|---|---|---|---|---|
| $Tx_D$, $Tx_C$ | 185 | 110 | 90 | 35 | 1.1 |
| $Rx_D$, $Rx_C$ | 765 | 90 | 60 | 35 | 0.5 |
| $Tx_{C\_Cali}$ | 12 | 75 | 60 | 10 | 1.1 |

The first transmit coil ($Tx_D$) of the detection part and the second transmit coil ($Tx_C$) and the calibration coil ($Tx_{C\_Cali}$) of the cancellation part may be connected by a single wire. The first transmit coil ($Tx_D$) of the detection part and the calibration coil ($Tx_{C\_Cali}$) of the calibration part may be wound in the same direction. The first transmit coil ($Tx_D$) of the detection part and the second transmit coil ($Tx_C$) of the cancellation part may be wound in opposite directions to allow current to flow back. The first receive coil ($Rx_D$) of the detection part and the second receive coil ($Rx_C$) of the cancellation part may be wound in the same direction.

The calibration coil ($Tx_{C\_Cali}$) of the cancellation part may be connected to a gear and screw portion. The gear and screw portion may include a screw portion and a gear portion, to which the calibration coil is coupled. The gear and screw portion may include at least one screw, wherein the screw may be connected to a knob through the gear portion.

The knob may be located at one side of the cancellation part. The rotation of the knob may rotate the screw through the gear portion. For example, if the knob is operated in a counterclockwise direction, the calibration coil ($Tx_{C\_Cali}$) coupled to the screw may move toward the knob by rotation of the screw. Conversely, if the knob is operated in a clockwise direction, the calibration coil may move away from the knob. That is, the calibration coil is movable toward or away from the knob.

Due to such connection characteristics, the RF signals of the transmit coils ($Tx_D$ and $Tx_C$) of the detection part and the cancellation part can be canceled through the receive coils ($Tx_D$ and $Tx_C$) of the detection part and the cancellation part, and the basic voltage signal can be lowered to zero by precise adjustment of the height of the calibration coil ($Tx_{C\_Cali}$) of the cancellation part. Therefore, the basic voltage signals of the detection part and the cancellation part can be calibrated, and only RF signal information of magnetic particles can be obtained.

Figure 3:
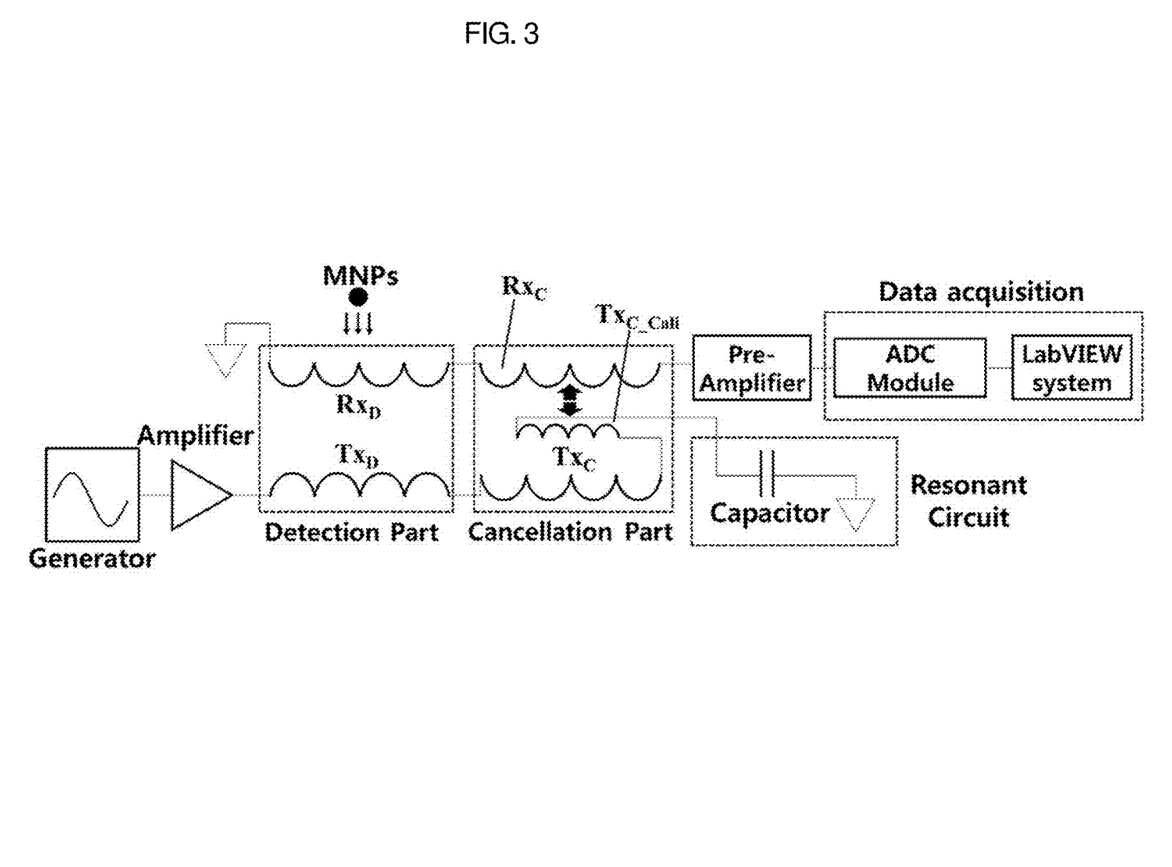
FIG. 3 is a circuit diagram of an open-structured RF transmitting and receiving coil system according to an embodiment of the present disclosure.

FIG. 3 is a circuit diagram of an open-structured RF transmitting and receiving coil system according to an embodiment of the present disclosure.

As can be seen from FIG. 3, a resonant circuit is configured by connection of a capacitor to the transmit coils ($Tx_D$, $Tx_C$, and $Tx_{C\_Cali}$), and a signal generator may generate an amplified RF signal having a resonant frequency in the transmit coils. The voltage induced in the receive coils ($Rx_D$, $Rx_C$) is subjected to noise removal and voltage signal amplification through a pre-amplifier, and the amplified voltage signal may be acquired through a data acquisition device.

The signal generator (KEYSIGHT 33210A) transmits the AC signal to a power amplifier (HAS 4014, NF Corporation, Japan). The power amplifier transmits the amplified AC voltage signal to the resonant circuit. The resonant circuit of the Tx coils was prepared to match with 21 nF measured by an LCR meter (Hioki 3522-50 LCR HiTESTER). In a receiving circuit, the induced voltage signal of the Rx coils is transmitted to the pre-amplifier (SRS SR560) for amplification and noise filtering. The amplified particle signal is measured by an analog-to-digital converter (ADC) module (RIGOL 3068) to acquire RMS voltage data with a frequency of 100 Hz. The measured data are recorded through LabView (National Instruments, USA).

The pre-amplifier, as an auxiliary device for attenuated signals generated in the calibration coil, is interconnected to a data acquisition chain and amplifies the attenuated signals by a factor of 5 to maximize the signal of magnetic nanoparticles. To reduce noise, the pre-amplifier was equipped with a bandpass filter with cut-off frequencies of 10 kHz and 30 kHz. The data acquisition rate was set to 0.1 second per sample, and particle signals for 100 samples were used to compare detection signals with and without nanoparticles.

Figure 4:
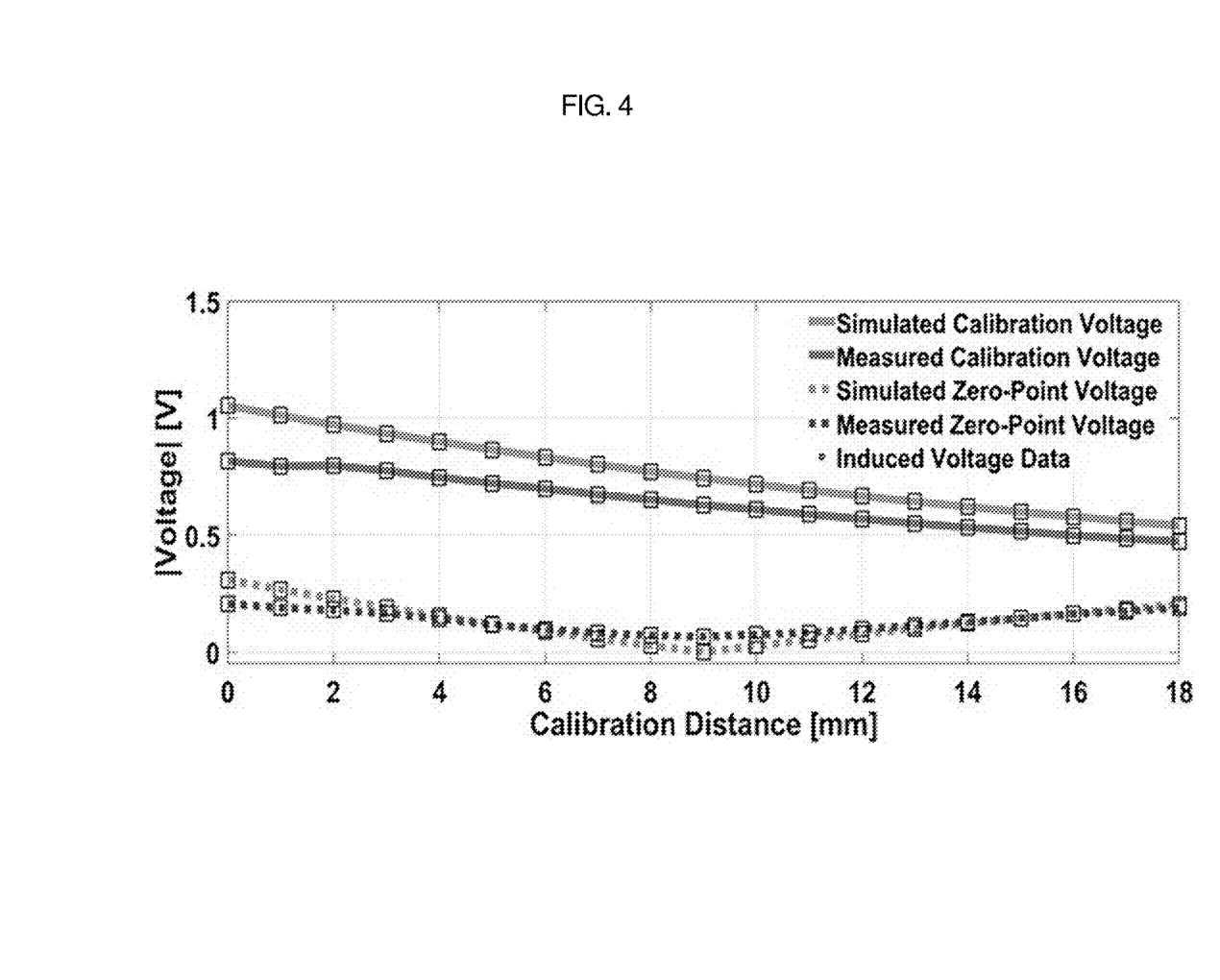
FIG. 4 compares simulation graphs and actual measurement result graphs in an open-structured RF transmitting and receiving coil system according to an embodiment of the present disclosure.

FIG. 4 compares simulation graphs and actual measurement result graphs in the open-structured RF transmitting and receiving coil system according to an embodiment of the present disclosure. In particular, simulation and actual measurement experiments for induced voltages were configured by selecting the input RF signal as 11.8 kHz and 10 Vpp and the capacitor as 21 nF.

As can be seen from FIG. 4, the voltages of the receive coils, induced from the calibration coil of the cancellation part, between the simulation and measurement results, showed similar characteristics in the intensity and tendency according to the position of the calibration coil. Considering the simulation and measurement results by combinations of all the transmit coils and receive coils, the induced voltage signal was calibrated to almost zero when the height of the calibration coil was 9 mm. The results confirmed that the basic voltage signal can be precisely lowered to zero by adjustment of the height of the calibration coil through the supposed RF transmitting and receiving coil structure.

Figure 5:
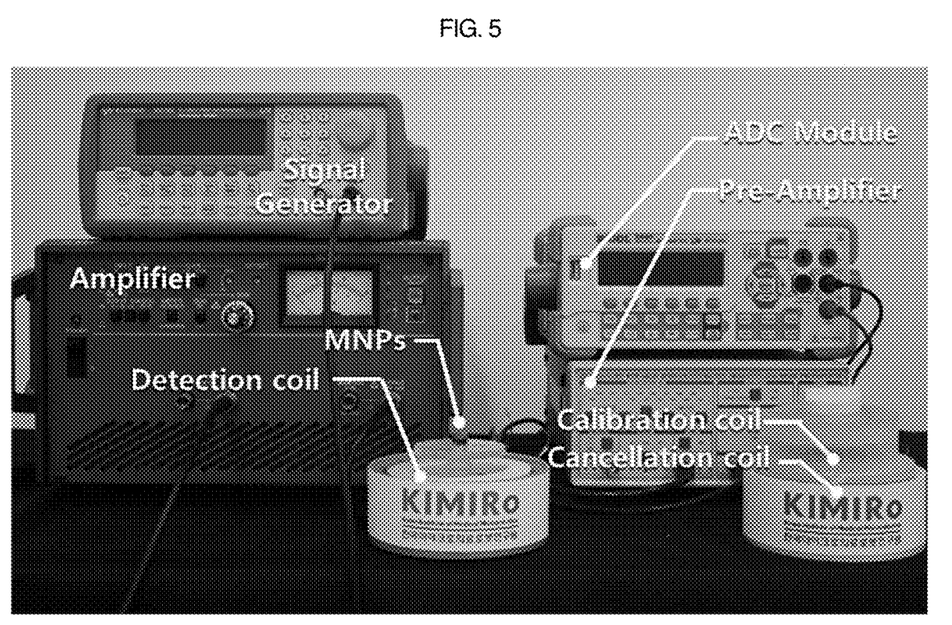
FIG. 5 is an image obtained by photographing an actual appearance of an open-structured RF transmitting and receiving coil system according to an embodiment of the present disclosure.

FIG. 5 is an image obtained by photographing an actual appearance of an open-structured RF transmitting and receiving coil system according to an embodiment of the present disclosure.

Figure 6:
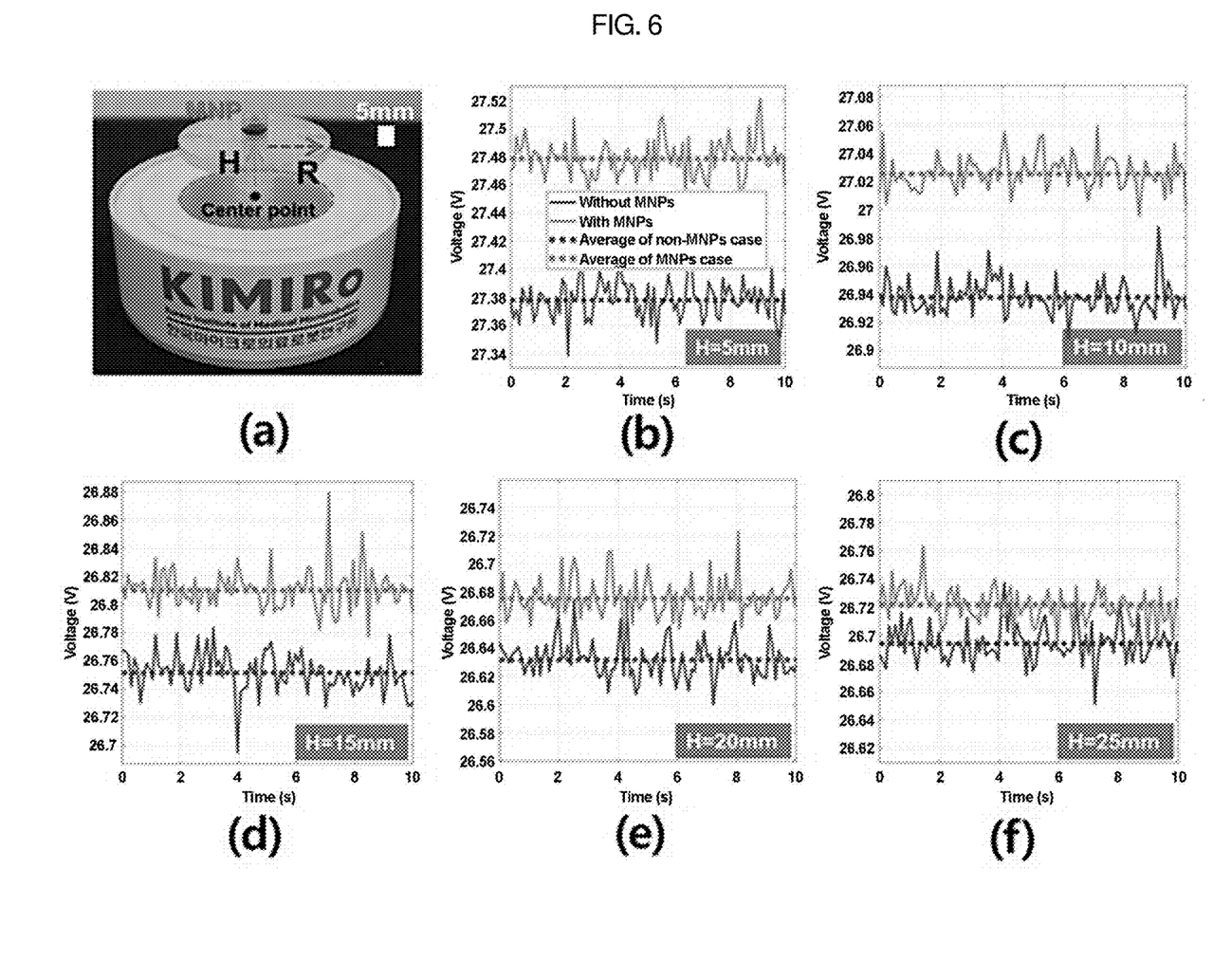
FIG. 6 shows graphs comparing voltage signals induced with and without magnetic particles while moving magnetic particles (Resovist) in the open-structured RF transmitting and receiving coil system according to an experimental example of the present disclosure.

FIG. 6 shows graphs comparing voltage signals induced with and without magnetic particles while moving magnetic particles (Resovist) in the open-structured RF transmitting and receiving coil system according to an experimental example of the present disclosure. For this, Resovist (Ferucarbotran, Meito Sangyo Company, Ltd., Japan) with an average iron content of 56 mg/mL was used.

As can be seen from FIG. 6, the pink graphs above show detection signals in the presence of magnetic particles, and blue graphs below show basic signals in the absence of magnetic particles in graphs (b) to (f). The dotted line passing through each graph indicates the average of each signal.

As can be seen from (a) of FIG. 6, the container containing magnetic nanoparticles was located at a position marked by the radial distance (R) and height (H), and these represent the distances of the magnetic nanoparticle sample in the radial direction and the normal direction from the center of the detection part, respectively. As can be seen from (b) to (f) of FIG. 6, to evaluate the detection range according to the normal direction, the container was moved up to 25 mm at intervals of 5 mm in the normal direction. Detection experiments with and without magnetic nanoparticles were conducted at each H position. The voltage signal was strong at a voltage level of 26 to 27 V, and as a result, the average voltage difference between the container with magnetic nanoparticles (upper graphs, pink dotted lines) and the container without magnetic nanoparticles (lower graphs, blue dotted lines) was 0.0977 V, 0.0850 V, 0.0555 V, 0.0434 V, and 0.0284 V in order from (b) to (f), respectively.

Furthermore, an H of 25 mm or more was considered. However, the induced voltage signal did not satisfy a range of the signal-to-noise ratio.

These results confirmed that through the voltage signal difference acquired with and without magnetic particles, the intensity of the magnetic particle detection signal can be measured, and the intensity of the detection signal and the height (H) of the magnetic particles were inversely proportional to each other.

Figure 7:
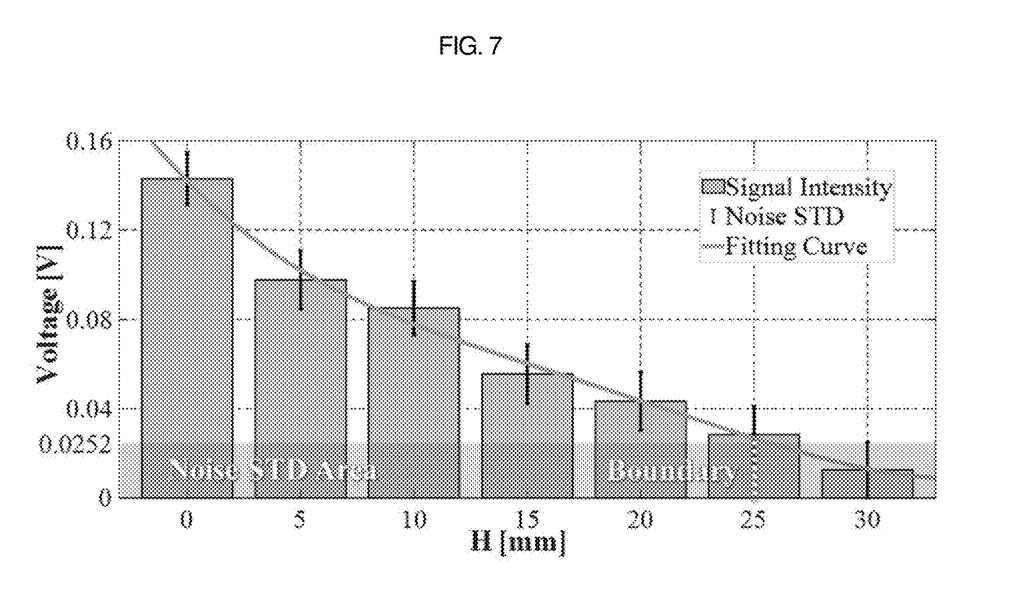
FIG. 7 is a graph showing the change in detection signal intensity according to the height of magnetic particles from the surface of the detection part according to an experimental example of the present disclosure.

FIG. 7 is a graph showing the change in detection signal intensity according to the height of magnetic particles from the surface of the detection part according to an experimental example of the present disclosure, indicating the signal intensity and noise standard deviation (STD) according to the height (H) in the normal direction at R=0.

As can be seen from FIG. 7, the corresponding noise standard deviations were 0.0117, 0.0130, 0.0120, 0.0132, 0.0131, and 0.0126 at the respective H values. At H=30, the signal intensity was 0.0124, which was smaller than the average noise standard deviation of 0.0126. It was therefore confirmed that the detection range in the H direction was 25 mm from the center of the detection part. In the open-structured RF transmitting and receiving coil system according to an embodiment of the present disclosure, the magnetic particles can be precisely detected when H is 25 mm or less, but the magnetic particles were difficult to precisely detect when H is 25 mm or more since the noise standard deviation and the detection signal intensity were difficult to distinguish.

Figure 8:
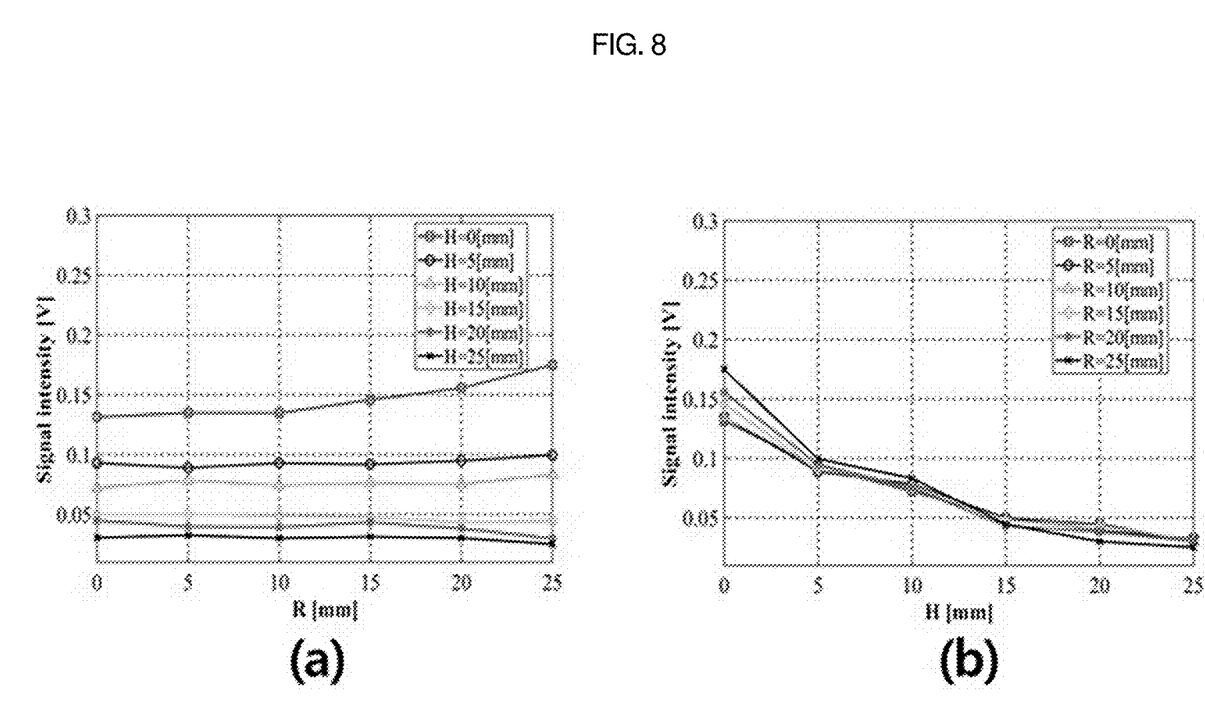
FIG. 8 shows graphs illustrating changes in detection signal intensity according to the distances in the height direction (H) and the radial direction (R) of magnetic particles from the surface center of the detection part according to an experimental example of the present disclosure.

FIG. 8 shows graphs illustrating changes in detection signal intensity according to the distances in the height direction (H) and the radial direction (R) of magnetic particles from the surface center of the detection part according to an experimental example of the present disclosure.

As can be seen from panel (a) of FIG. 8, when the height (H) of magnetic particles was constant, the detection signal intensity was uniform even though the position of magnetic particles in the radial direction was changed. As can be seen from panel (b) of FIG. 8, when the height (H) of magnetic particles was changed, the detection signal intensity was lowered regardless of the change in the position in the radial direction (R). These results were consistent with the experimental results confirmed in FIG. 7.

Overall, the open-structured RF transmitting and receiving coil system according to an embodiment of the present disclosure can detect the position of magnetic particles placed in a three-dimensional location even though the system has the open structure, and the detectable range for the three-dimensional position of magnetic particles was, based on the xy plane, a plane on which the magnetic particles are placed, 50 mm in the x-axis direction, 50 mm in the y-axis direction, and 25 mm in the vertical z-axis direction, that is, a magnetic field placed in a region in the range of 50×50×25 mm$^3$ can be detected. In addition, the detective performance is superior with respect to the height (H) in the normal direction rather than the distance (R) in the radial direction. In particular, the detection range according to the distance in the radial direction is similar to the inner radius, that is, 30 mm, of the Rx coils of the detection part. The detectable volume by the proposed open-structured RF transmitting and receiving coil system was evaluated to be higher than previous studies on bore-type MPS systems, and resultantly, the targeting of magnetic nanoparticles can be achieved through the open-structured RF transmitting and receiving coil system supposed on the basis of the experimental results and analysis.

| Explanation of reference numerals | |
|---|---|
| 100: detection part | 120: first Tx coil |
| 140: first Rx coil | 200: cancellation part |
| 220: second Tx coil | 240: second Rx coil |
| 300: cancellation part | 320: third Tx coil |
| 322: plate | 324: calibration coil winding portion |
| 326: protruding portion | 420: knob |
| 440: screw | 500: magnetic field generation part |
| 600: coupling part | |

What is claimed is:

1. An open-structured RF transmitting and receiving coil system, the system comprising:
a magnetic field generation part comprising a first electromagnet set comprising one or more electromagnets facing a region of interest (ROI) in a three-dimensional space and a second electromagnet set comprising one or more electromagnets disposed symmetrically with the first electromagnet set;
coupling parts coupled to the electromagnet sets, respectively;
a detection part disposed below the region of interest;
a cancellation part connected to the detection part; and
a power source part configured to independently apply current to each of the electromagnets,
wherein the cancellation part comprises a second Rx coil and a second Tx coil and has a second through hole in the center thereof, the cancellation part further comprising a calibration coil section at one side of the second through hole.

2. The system of claim 1, wherein the electromagnets are at least one type of coil selected from the group consisting of a solenoid coil, a circular coil, a square coil, and a saddle coil.

3. The system of claim 1, wherein the detection part comprises a first Rx coil and a first Tx coil and has a first through hole in the center thereof.

4. The system of claim 1, wherein the calibration coil section comprises: at least one screw directed in a direction in which the second through hole passes through; and a third Tx coil coupled to the thread of the screw through a plate.

5. The system of claim 4, wherein the third Tx coil comprises:
a calibration coil winding portion wound along the outer circumferential surface of the plate; and
a protruding portion, which is a peripheral portion of the outer circumferential surface of the plate protruding from the calibration coil winding portion to be adjacent to the inner circumferential surface of the calibration coil section.

6. The system of claim 4, wherein the third Tx coil is configured to be able to slide by rotation of the screw.

7. The system of claim 1, wherein the calibration coil section further comprises a knob coupled to the screw to be able to rotate the screw.

8. The system of claim 1, further comprising a signal amplification part connected to the cancellation part.

9. The system of claim 8, further comprising a data acquisition part configured to receive a voltage signal amplified by the signal amplification part.

* * * * *